United States Patent
Akkarakaran et al.

(10) Patent No.: US 11,228,992 B2
(45) Date of Patent: Jan. 18, 2022

(54) UPLINK TRANSMISSIONS WITHOUT TIMING SYNCHRONIZATION IN WIRELESS COMMUNICATION

(71) Applicant: QUALCOMM Incorporated, San Diego, CA (US)

(72) Inventors: Sony Akkarakaran, Poway, CA (US); Muhammad Nazmul Islam, Edison, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/969,281

(22) Filed: May 2, 2018

(65) Prior Publication Data

US 2018/0324723 A1 Nov. 8, 2018

Related U.S. Application Data

(60) Provisional application No. 62/502,394, filed on May 5, 2017.

(51) Int. Cl.
*H04W 56/00* (2009.01)
*H04W 72/04* (2009.01)
(Continued)

(52) U.S. Cl.
CPC ..... *H04W 56/001* (2013.01); *H04W 72/0413* (2013.01); *H04W 88/02* (2013.01); *H04W 88/08* (2013.01)

(58) Field of Classification Search
CPC ............... H04W 56/00; H04W 56/001; H04W 56/0045; H04W 56/0005; H04W 72/0446;
(Continued)

(56) References Cited

U.S. PATENT DOCUMENTS 9,497,714 B2 11/2016 Nagaraja et al.
2003/0119452 A1* 6/2003 Kim .................... H04W 52/146
455/69

(Continued)

FOREIGN PATENT DOCUMENTS

| CN | 101416557 A | 4/2009 |
| CN | 101461279 A | 6/2009 |

(Continued)

OTHER PUBLICATIONS

International Search Report and Written Opinion—PCT/US2018/030984—ISA/EPO—dated Aug. 17, 2018.
(Continued)

*Primary Examiner* — Peter Chen
(74) *Attorney, Agent, or Firm* — Loza & Loza, LLP

(57) ABSTRACT

Aspects of the present disclosure provide methods, apparatuses, and embodiments for transmitting time critical uplink (UL) control information (e.g., beam failure indication, buffer status report, and scheduling request) without first obtaining UL timing synchronization with a network. Therefore, UL communication latency may be reduced by removing the signaling overhead involved in performing a full random access procedure to obtain UL synchronization prior to UL transmission.

24 Claims, 12 Drawing Sheets

(51) Int. Cl.
*H04W 88/02* (2009.01)
*H04W 88/08* (2009.01)

(58) Field of Classification Search
CPC ............. H04W 72/0413; H04L 5/0005; H04L 5/0055; H04L 5/0023; H04L 27/2692; H04L 27/2655; H04L 27/2671
See application file for complete search history.

(56) References Cited

U.S. PATENT DOCUMENTS

| | | | | |
|---|---|---|---|---|
| 2009/0011718 | A1* | 1/2009 | Chun | H04W 56/00 455/70 |
| 2013/0039231 | A1* | 2/2013 | Wang | H04W 72/10 370/280 |
| 2013/0288698 | A1* | 10/2013 | Rune | H04W 74/08 455/452.1 |
| 2014/0133443 | A1* | 5/2014 | Malladi | H04L 1/0029 370/329 |
| 2014/0200009 | A1* | 7/2014 | Schier | H04W 64/00 455/446 |
| 2015/0092702 | A1 | 4/2015 | Chen et al. | |
| 2017/0013610 | A1* | 1/2017 | Lee | H04L 1/00 |
| 2017/0078058 | A1* | 3/2017 | Marinier | H04L 5/0044 |
| 2019/0124691 | A1* | 4/2019 | Harada | H04W 74/0808 |
| 2019/0141728 | A1* | 5/2019 | Takeda | H04W 28/06 |

FOREIGN PATENT DOCUMENTS

| | | |
|---|---|---|
| CN | 101674661 A | 3/2010 |
| CN | 103228038 A | 7/2013 |
| CN | 103929713 A | 7/2014 |
| TW | 201714465 A | 4/2017 |
| WO | 2012040638 A1 | 3/2012 |
| WO | 2016175496 A1 | 11/2016 |

OTHER PUBLICATIONS

NTTDocomo Inc: "Summary (with revision marks) of Email Discussion Point 3: Initial Access Procedure: C-RNTI and Harq", 3GPP TSG RAN WG2 #56bis, Tdoc-R2-070338, Jan. 15-19, 2007, Sorrento, Italy, Jan. 13, 2017, URL: https://www.3gpp.org/ftp/tsg_ran/WG2_RL2/TSGR2_56bis/Documents/R2-070338.zip, pp. 1-10.
Taiwan Search Report—TW107115035—TIPO—dated Oct. 29, 2021.

* cited by examiner

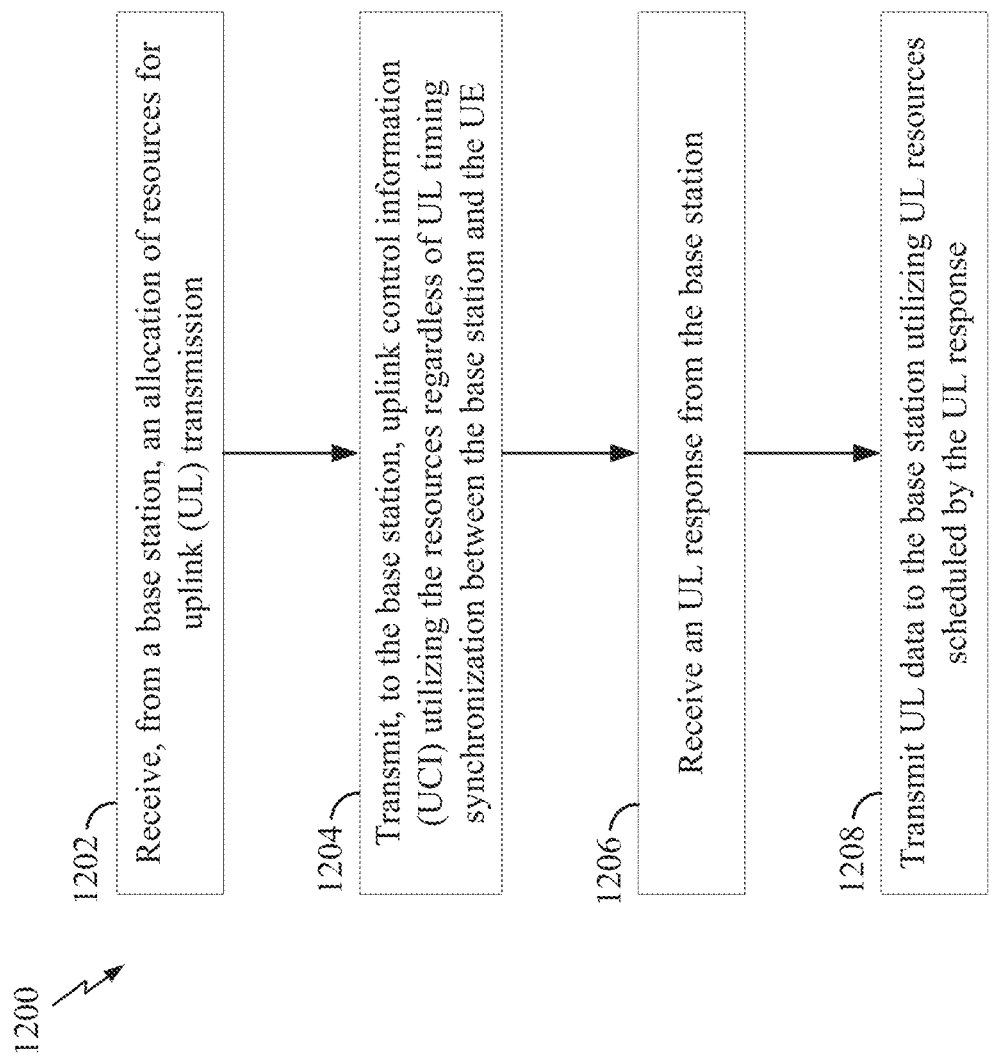

UPLINK TRANSMISSIONS WITHOUT TIMING SYNCHRONIZATION IN WIRELESS COMMUNICATION

PRIORITY CLAIM

This application claims priority to and the benefit of U.S. provisional patent application No. 62/502,394 filed in the United States Patent and Trademark Office on May 5, 2017, the entire content of which is incorporated herein by reference as if fully set forth below in its entirety and for all applicable purposes.

TECHNICAL FIELD

The technology discussed below relates generally to wireless communication systems, and more particularly, to uplink (UL) transmissions without UL timing synchronization.

INTRODUCTION

In wireless communication, a user equipment (UE) generally needs to have timing synchronization with a network (e.g., base station) before the UE can access the network to transmit uplink data. For example, in an LTE (Long-Term Evolution) network, the UE performs a random access procedure to achieve timing synchronization with a base station and obtains network resources for transmitting uplink data. During the random access procedure, the UE transmits a random access channel (RACH) request (commonly called message 1) to the base station. In response, the base station transmits a RACH response (commonly called message 2) to the UE with a UE ID, for example, Cell Radio Network Temporary ID (C-RNTI) or Temporary C-RNTI. Then, the UE transmits a UE identification message (commonly called message 3) to the base station using the UE ID. UL timing synchronization may be acquired through this RACH procedure in message 2 (i.e., RACH Response). Research and development continue to advance and enhance UL access to reduce UL latency in wireless communication.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure provides a method of wireless communication operable at a user equipment (UE). The UE receives, from a base station, a resource configuration that allocates resources for sync-less uplink (UL) transmission that does not need UL synchronization. The UE transmits, to the base station, uplink control information (UCI) utilizing the resources regardless of UL timing synchronization between the base station and the UE. The UE receives a base station response corresponding to the UCI from the base station. For example, the base station response may be an UL grant. The UE transmits UL data to the base station based on the base station response. For example, the UE may transmit data in an uplink data channel using sync-less UL resource.

Another aspect of the disclosure provides a method of wireless communication operable at a base station. The base station transmits, to a user equipment (UE), a resource configuration that allocates resources for sync-less uplink (UL) transmission. The base station receives, from the UE, uplink control information (UCI) utilizing the resources regardless of UL timing synchronization between the UE and the base station. The base station transmits a base station response corresponding to the UCI to the UE. For example, the base station response may be an UL grant. The base station receives UL data from the UE based on the base station response.

Another aspect of the disclosure provides a base station configured for wireless communication. The base station includes a communication interface configured to communicate with a user equipment (UE), a memory, and a processor operatively coupled with the communication interface and the memory. The processor and the memory are configured to transmit, to the UE, a resource configuration that allocates resources for sync-less uplink (UL) transmission. The processor and the memory are further configured to receive, from the UE, uplink control information (UCI) utilizing the resources regardless of UL timing synchronization between the UE and the base station. The processor and the memory are further configured to transmit a base station response corresponding to the UCI to the UE. The processor and the memory are further configured to receive UL data from the UE based on the base station response.

Another aspect of the disclosure provides a user equipment (UE) configured for wireless communication. The UE includes a communication interface configured to communicate with a base station, a memory, and a processor operatively coupled with the communication interface and the memory. The processor and the memory are configured to receive, from a base station, a resource configuration that allocates resources for sync-less uplink (UL) transmission. The processor and the memory are further configured to transmit, to the base station, uplink control information (UCI) utilizing the resources regardless of UL timing synchronization between the base station and the UE. The processor and the memory are configured to receive a base station response corresponding to the UCI from the base station. The processor and the memory are further configured to transmit UL data to the base station based on the base station response.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 12 is a flow chart illustrating an exemplary process for transmitting uplink control information without UL timing synchronization between a UE and a base station according to some aspects of the disclosure.

DETAILED DESCRIPTION

Figure 1:
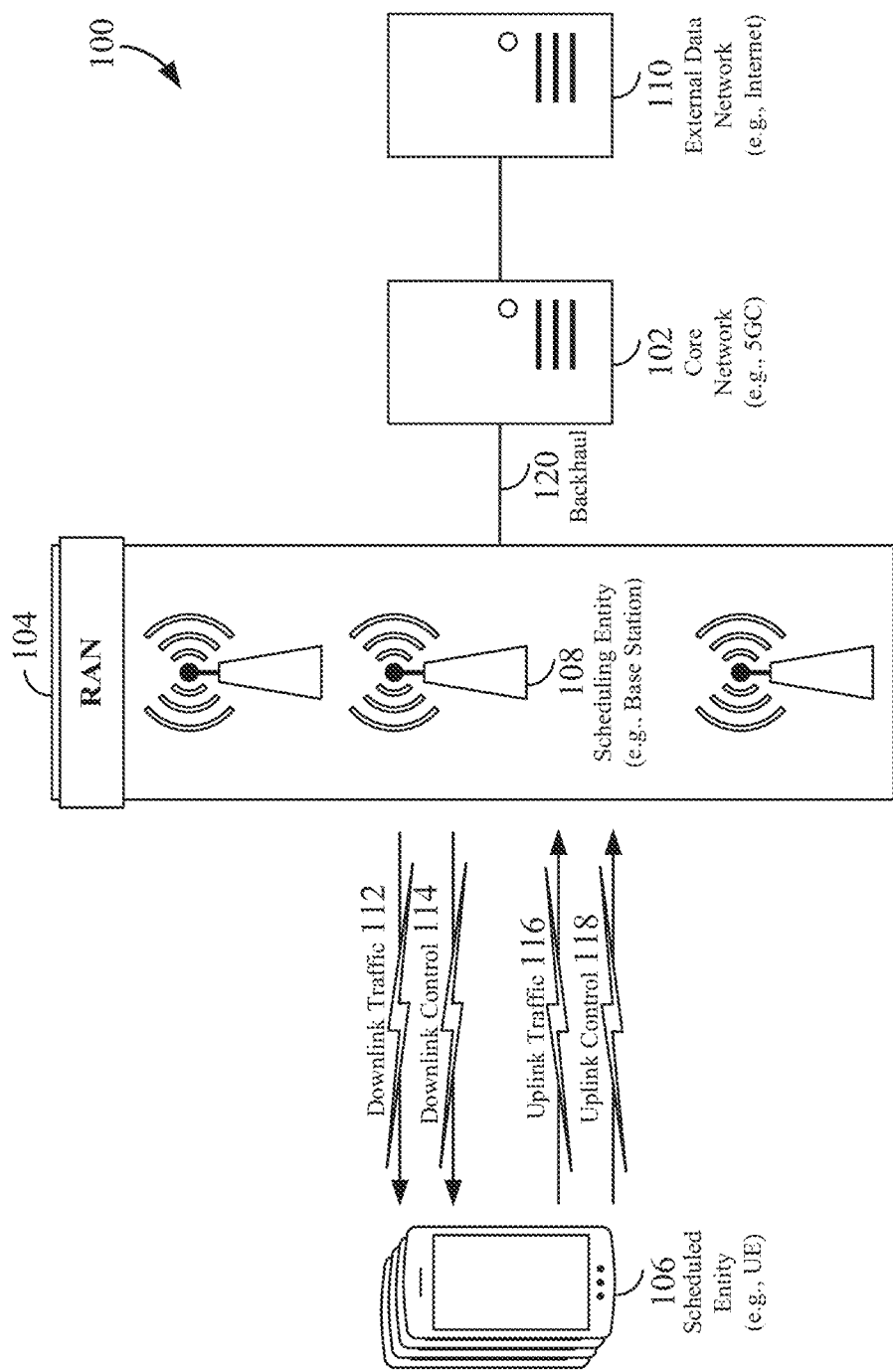
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In the next generation networks, e.g., 5G New Radio (NR), a user equipment (UE) may transmit beam failure indication and/or scheduling request (SR) within and without random access channel (RACH) slots or resources. Beam failure indication may also be referred to as beam failure recovery (BFR) request, BFR RACH, BFR preamble, etc. In some aspects of the disclosure, the UE can transmit time critical uplink (UL) control information (e.g., beam failure indication and SR) without first obtaining UL timing synchronization with the network by performing a full random access procedure. In some aspects of the disclosure, UL communication latency may be reduced by removing the signaling overhead involved in a full random access procedure or the like.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. In some examples, the wireless communication system 100 may be implemented as a 5G NR network. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
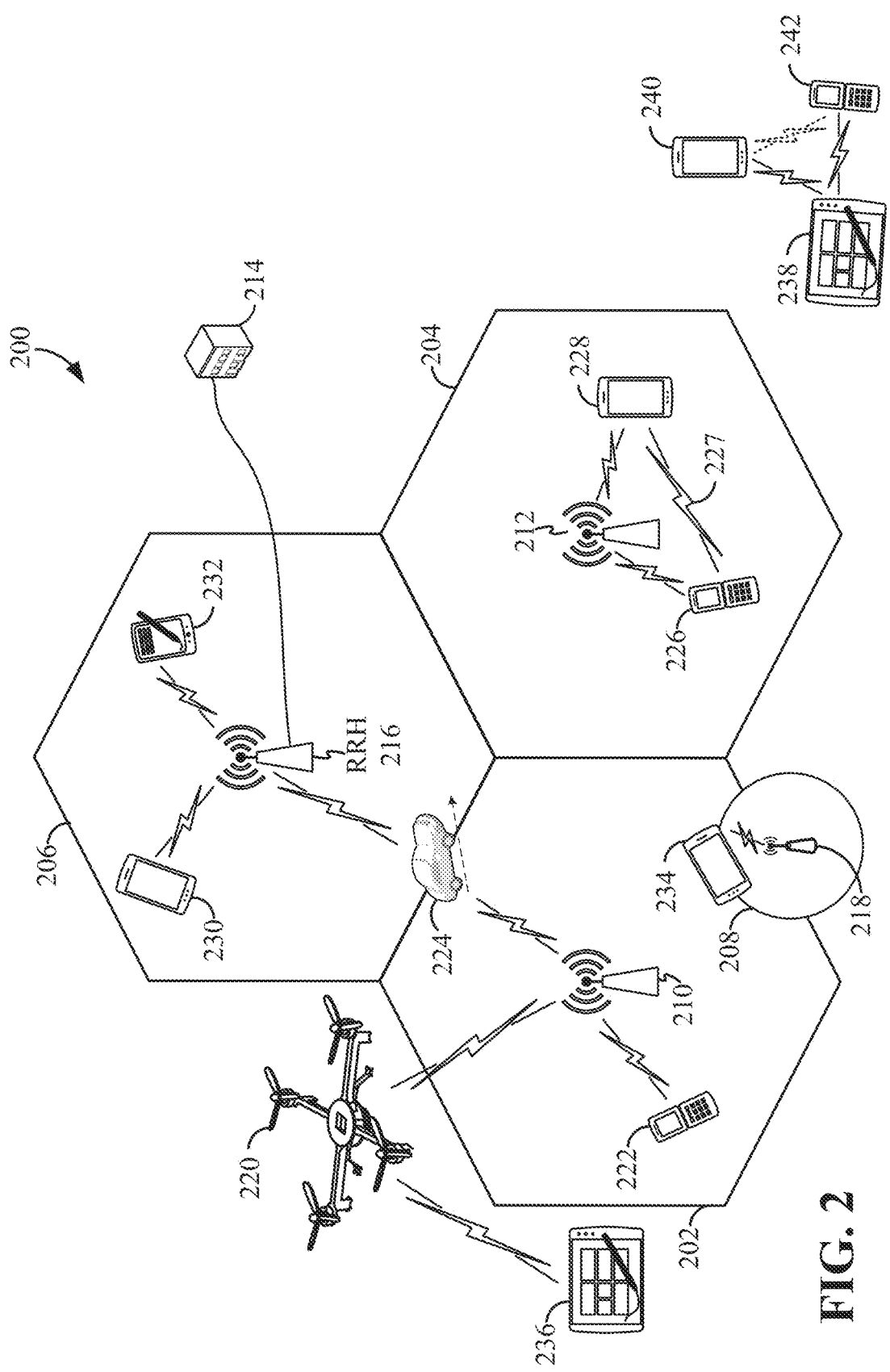
FIG. 2 is a conceptual illustration of an example of a radio access network.

FIG. 2 is a conceptual illustration of an example of a radio access network (RAN) 200. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

For uplink timing synchronization, the UE may use a random access procedure to achieve UL timing synchronization with the base station. In one example, the UE may transmit a random access channel (RACH) preamble or request to the base station. The UE may transmit the RACH request using certain RACH resources (e.g., RACH slots) allocated by the base station, for example, in a RACH configuration, which may be provided by the base station in a system information block (SIB). In return, the base station sends a RACH response to the UE. This RACH response may include timing advance, Temporary Cell Radio Network Temporary ID (T_C-RNTI), and UL grant. With the timing advance, the UE may synchronize its timing with the base station and start transmitting UL data using UL resources based on the UL grant.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
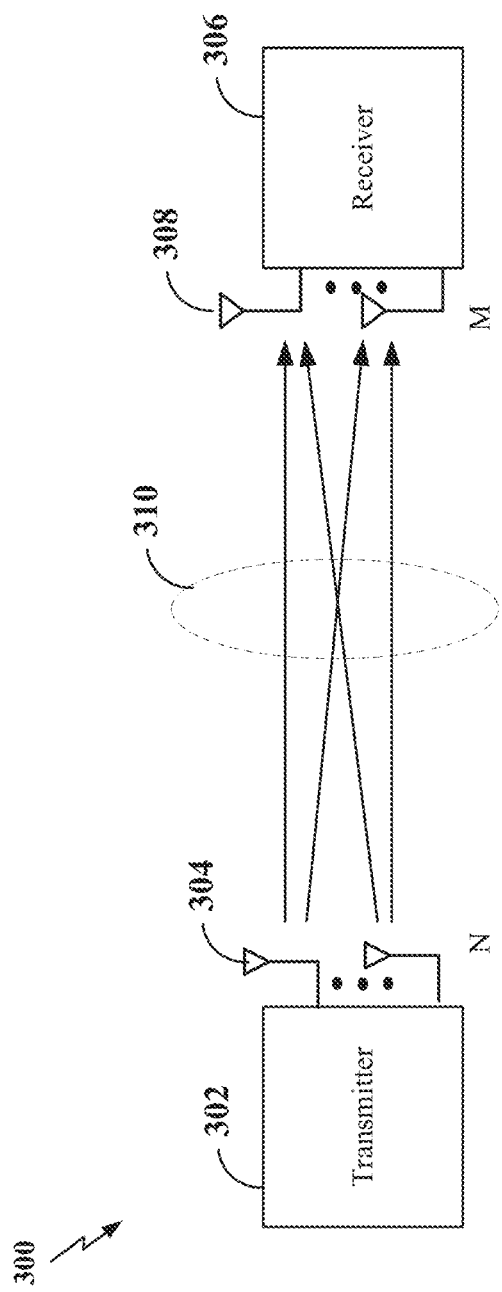
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 202, a scheduled entity 204, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream. In beamforming, the amplitude and phase of each antenna in an array of antennas may be precoded, or controlled to create a desired pattern (i.e., directional beam) of constructive and destructive interference in the wavefront.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described hereinbelow. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple numbers of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
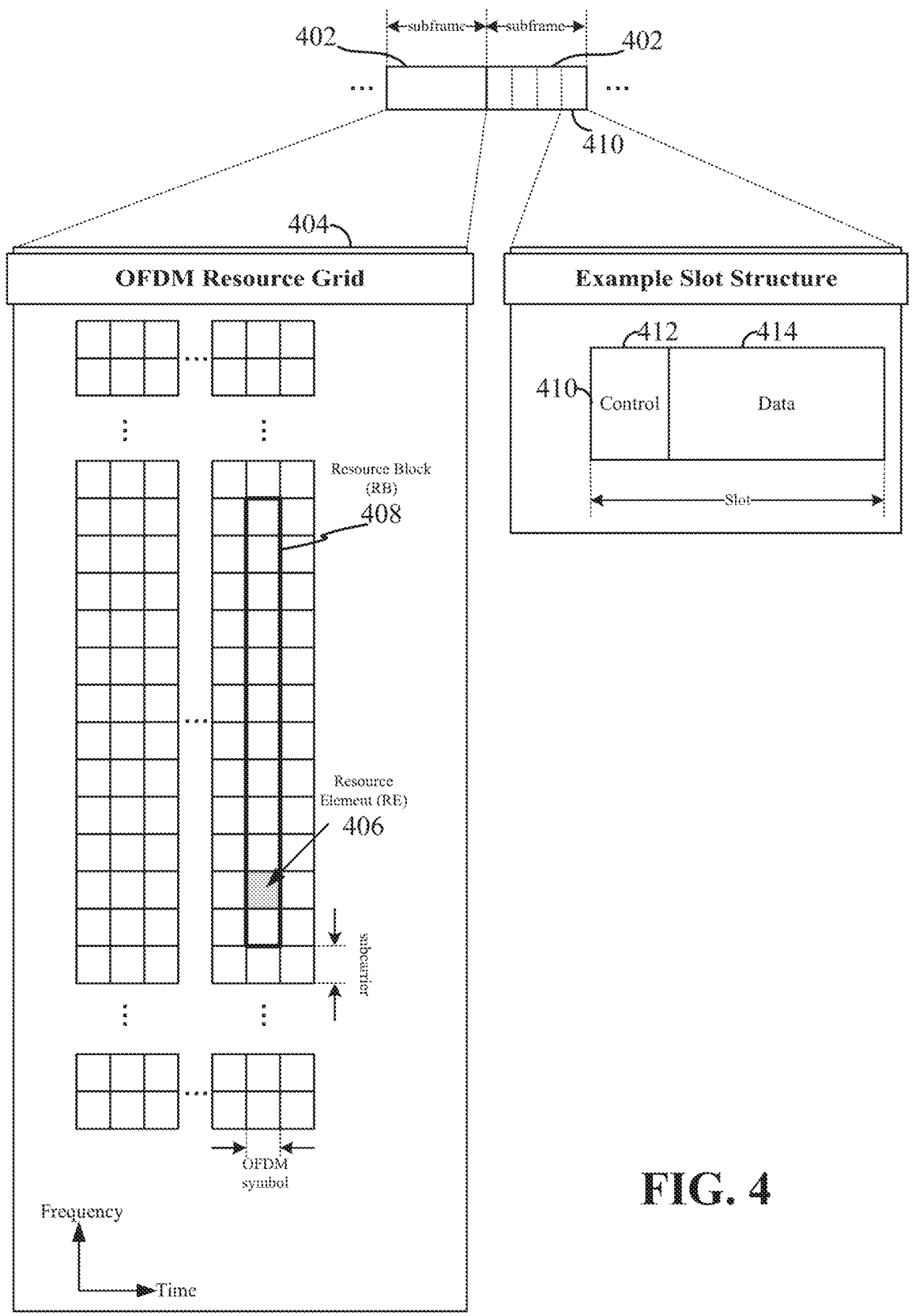
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. In some examples, the scheduling entity may allocate certain UL resources for use in UL transmission and RACH procedure. The scheduling entity may indicate the allocation in DL control information.

In an UL transmission, the transmitting device (e.g., the scheduled entity 106 or UE) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

In some aspects of the disclosure, a scheduled entity (e.g., UE) may transmit uplink control information (UCI) using the PUCCH or PUSCH. Some examples of UL control information include scheduling request (SR), buffer status report (BSR), HARQ ACK/NACK, CQI, etc. In addition, in a 5G NR network, the UE may transmit other UL control information such as a beam failure indication. The UE may transmit the beam failure indication to indicate that a beam (e.g., a MIMO beam) or link with the base station or scheduling entity is likely to fail or has a quality less than a predetermined threshold. In response, for example, the base station may adjust the beam or initiate a handover procedure. In some examples, the UE may transmit a beam failure indication and SR in RACH slots or non-RACH slots. In some networks, the UE first establishes UL timing synchronization before it transmits UCI to the base station. In an LTE example, the UE may perform a full random access procedure or the like to achieve UL timing synchronization (referred to as "UL sync" in this disclosure). However, a full random access procedure involves significant signaling overhead that increases the latency in transmitting time critical UCI (e.g., SR, BSR, beam failure indication).

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In some aspects of the disclosure, a network may allocate certain UL resources that allow a UE to transmit UL data without achieving UL sync. For example, the base station may allocate some resources (e.g., REs, RBs, or PRBs) in each slot or a predetermined number of slots for UCI transmission without UL sync. These resources may be referred to as sync-less UL resources or sync-less resources in this disclosure. In some aspects of the disclosure, the UE may transmit UCI (e.g., beam failure indication, SR, BSR) on sync-less UL resources without achieving UL sync. In some aspects of the disclosure, the base station may allocate the sync-less UL resources using a process similar to that used for RACH resources allocation.

Aspects of the present disclosure provide various processes and methods that enable a UE to transmit time critical UCI without first obtaining UL synchronization (UL sync) with a base station or scheduling entity. The base station may allocate specific network resources (e.g., UL REs) dedicated to UCI transmission without UL sync. In some examples, the base station may allocate specific UL resources for transmitting beam failure indication, SR, and/or BSR.

Figure 5:
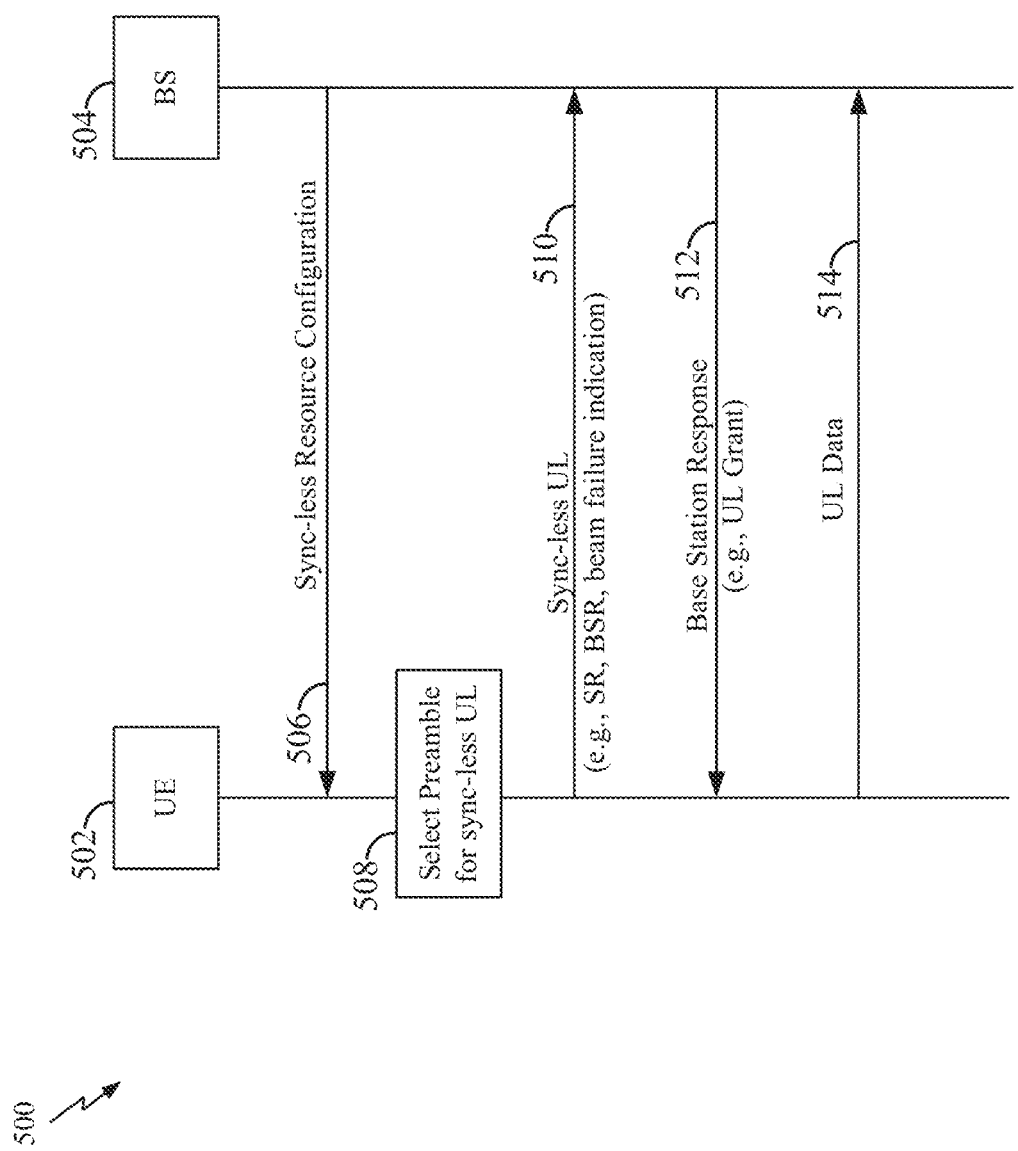
FIG. 5 is a diagram illustrating an uplink (UL) transmission process without UL synchronization according to some aspects of the disclosure.

FIG. 5 is a diagram illustrating an uplink (UL) transmission signaling diagram 500 without requiring UL synchronization between a UE 502 and a base station 504 according to some aspects of the disclosure. In some examples, the process 500 may be carried out by the scheduling entity 108 and scheduled entity 106 illustrated in FIG. 1. The UE 502 and base station 504 may correspond to the scheduled entity 106 and scheduling entity 108, respectively. In some examples, the signaling may be carried out by any suitable apparatus or means for carrying out the functions or algorithm described below.

Initially, the base station 504 may transmit a sync-less resource configuration 506 to the UE. The sync-less resource configuration 506 allocates sync-less UL resources to the UE for UL transmission. For example, the resource configuration 506 may indicate certain slots and/or frequency resources (e.g., PRBs or subbands) that may be used by the UE to transmit sync-less UL control information (e.g., beam failure indication, SR, BSR) or other time critical information, with or without UL synchronization. In some examples, the resource configuration 506 may provide a number of preambles or preamble sequences that may be used for transmitting UL data or UCI using the sync-less UL resources. The base station 504 may transmit the sync-less resource configuration 506 using broadcast and/or dedicated messages (e.g., SIB, DCI, RRC messages). When the UE transmits sync-less UL control information, it selects a preamble sequence 508 corresponding to the allocated sync-less UL resources. The preamble sequence 508 may be one of the preamble sequences provided in the sync-less resource configuration. Then, the UE may transmit the sync-less UL control information 510 using the UL resources corresponding to the selected preamble sequence. In some examples, the sync-less UL control information 510 may include an SR, BSR, or beam failure indication. The preamble sequence allows the base station to differentiate between multiple UEs transmitting sync-less UL data using the same resources in the same slot. The UE may determine the UL resources (e.g., sync-less resources) for transmitting the UL control information based on the resource configuration 506 received earlier from the base station 504.

Figure 11:
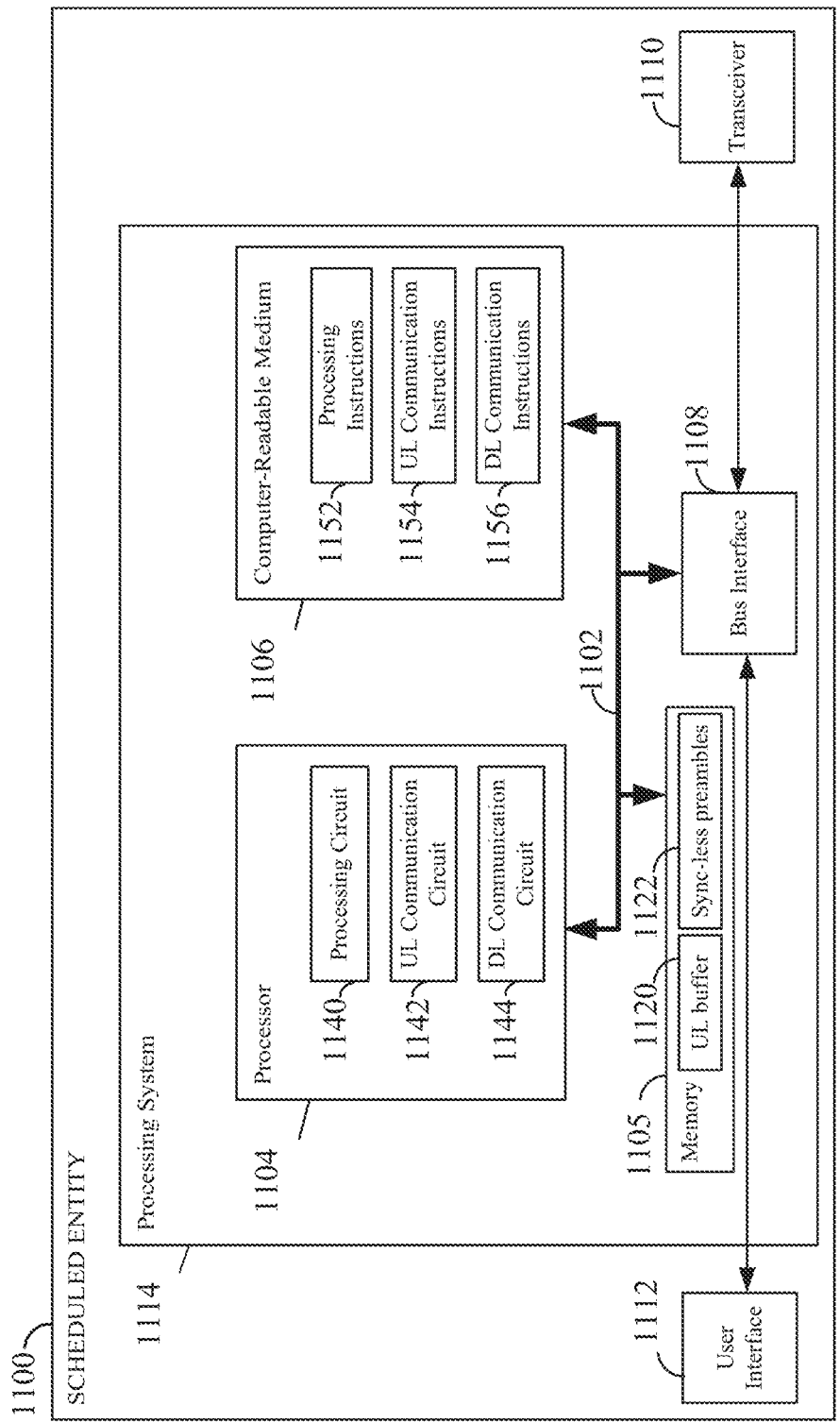
FIG. 11 is a block diagram conceptually illustrating an example of a hardware implementation for a scheduled entity according to some aspects of the disclosure.

The UE 502 may store the UL data before transmission in a buffer (e.g., memory 1105 of FIG. 11). The UE may receive the UL data from a higher layer (e.g., RRC layer, MAC). Therefore, the UE may request UL resources from the base station 504 using the sync-less UCI 510 to reduce UL latency. For example, the UE 502 may transmit a scheduling request (SR) in the UCI 510 in an UL control channel (e.g., PUCCH). In some examples, the UE 502 may transmit channel measurements to the base station with the SR or separately. The UE may determine the UL resources (e.g., sync-less resources) for transmitting the SR based on the resource configuration 506 received earlier from the base station 504. In response to the SR, the base station 504 transmits an UL grant 512 (base station response) to the UE using a DL control channel (e.g., PDCCH). The UL grant may be included in a DCI or base station response dedicated to the UE. Then, the UE may transmit UL data 514 using resources allocated in the UL grant. In some examples, the UE may transmit the UL data 514 using an UL data channel (e.g., PUSCH).

The process 500 described above is different from LTE in which a UE needs to have UL timing synchronization with a base station before the UE transmits an SR or other UCI. To achieve UL sync in LTE, the UE may perform a full random access procedure to obtain timing synchronization with the base station. However, performing such random access procedure will add delay and increase latency to UL transmission.

In some aspects of the disclosure, the sync-less resource configuration 506 may provide an indication that explicitly or implicitly indicates whether allocated resources (e.g., PRB or REs) can carry sync-less UL data. For example, the resource configuration 506 may have specific data fields or flags that explicitly indicate whether the corresponding resources may be used for transmitting certain time critical UL control information without achieving UL sync.

In some examples, the resource configuration 506 may implicitly indicate whether allocated resources allow sync-less UCI transmission based on the type of UCI to be carried by the resource, slot, carrier, and/or resource block index. For example, it may be predetermined that certain UCI or time critical control information (e.g., SR, beam failure indication) can be transmitted without UL sync on some UL sync-less resources. In some examples, it may be predetermined that resources corresponding to certain slot indexes and/or predetermined frequency resources (e.g., PRBs or subbands) can be used to transmit sync-less UL control information. In other examples, other methods for implicitly indicating sync-less UL resources may be used. In some examples, the base station may reconfigure the sync-less UL resources by sending different configurations in different slots dynamically or semi-statically. The base station may also configure other parameters that restrict the use of the sync-less UL resources. For example, the transmission may be allowed only if the amount of time the UE has been out of timing synchronization does not exceed a threshold. In another example, the sync-less resources are similar to other resources that require timing synchronization, but the criteria for being in timing synchronization are relaxed for transmission on the sync-less resources.

Figure 6:
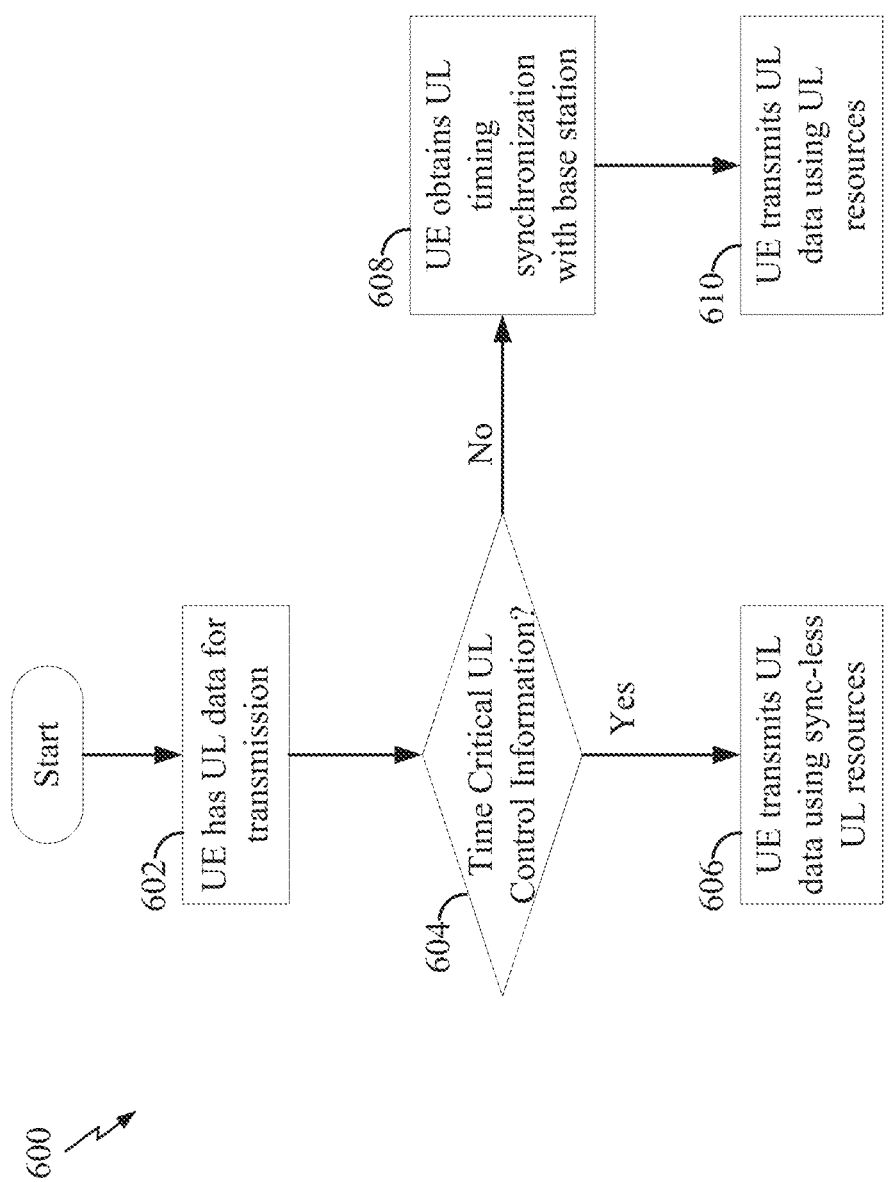
FIG. 6 is a flow chart illustrating a process for transmitting UL control information using sync-less UL resources according to some aspects of the disclosure.

FIG. 6 is a flow chart illustrating a process 600 for transmitting UL control information using sync-less resources according to some aspects of the disclosure. In some examples, the process 600 may be carried out by the scheduled entity 106 illustrated in FIG. 1. In some examples, the process 600 may be carried out by any suitable apparatus or means for carrying out the functions or algorithm described below.

Starting from block 602, a UE or scheduled entity may determine that it has UL data for transmission. At this point, the UE has not established UL timing synchronization with a base station (e.g., scheduling entity 108). In some networks like LTE, the UE needs to achieve UL synchronization with the network before the UE can transmit the UL data. However, according to some aspects of the present disclosure, the UE may transmit certain UL control information without first establishing UL synchronization using sync-less resources as described above.

At decision block 604, the UE determines whether the UL data is time critical UCI, for example, beam failure indication, SR, BSR, etc. In some examples, the UE may predetermine certain UL data to be time critical or have higher priority than other UL data. If the UL data is time critical UCI (yes branch of block 604), the process proceeds to block 606; otherwise (no branch of block 604), the process proceeds to block 608. At block 606, the UE may transmit the time critical UCI using sync-less UL resources that allow transmission of time critical UCI without UL sync. The sync-less UL resources may be allocated by the base station as described above in relation to FIG. 5. For example, the base station may allocate certain REs, PRBs, or sub-carriers in a slot for sync-less UL transmission. For UCI that is not time critical, at block 608, the UE first obtains UL synchronization with the base station before it transmits the UL data using UL resources at block 610. For example, the UE may perform a full RACH procedure to achieve UL synchronization with the base station.

In one example, in a full RACH procedure, the UE transmits a RACH request to the base station. After receiving the RACH request, the base station allocates a temporary identity (e.g., TC-RNTI) to the UE. The base station transmits the temporary identity to the UE as part of a RACH response. The RACH response may include a timing advance value so that the UE can align its UL transmission timing based on the timing advance value. The RACH response also provides an UL grant that allocates uplink resources to the UE for UL transmission.

Figure 7:
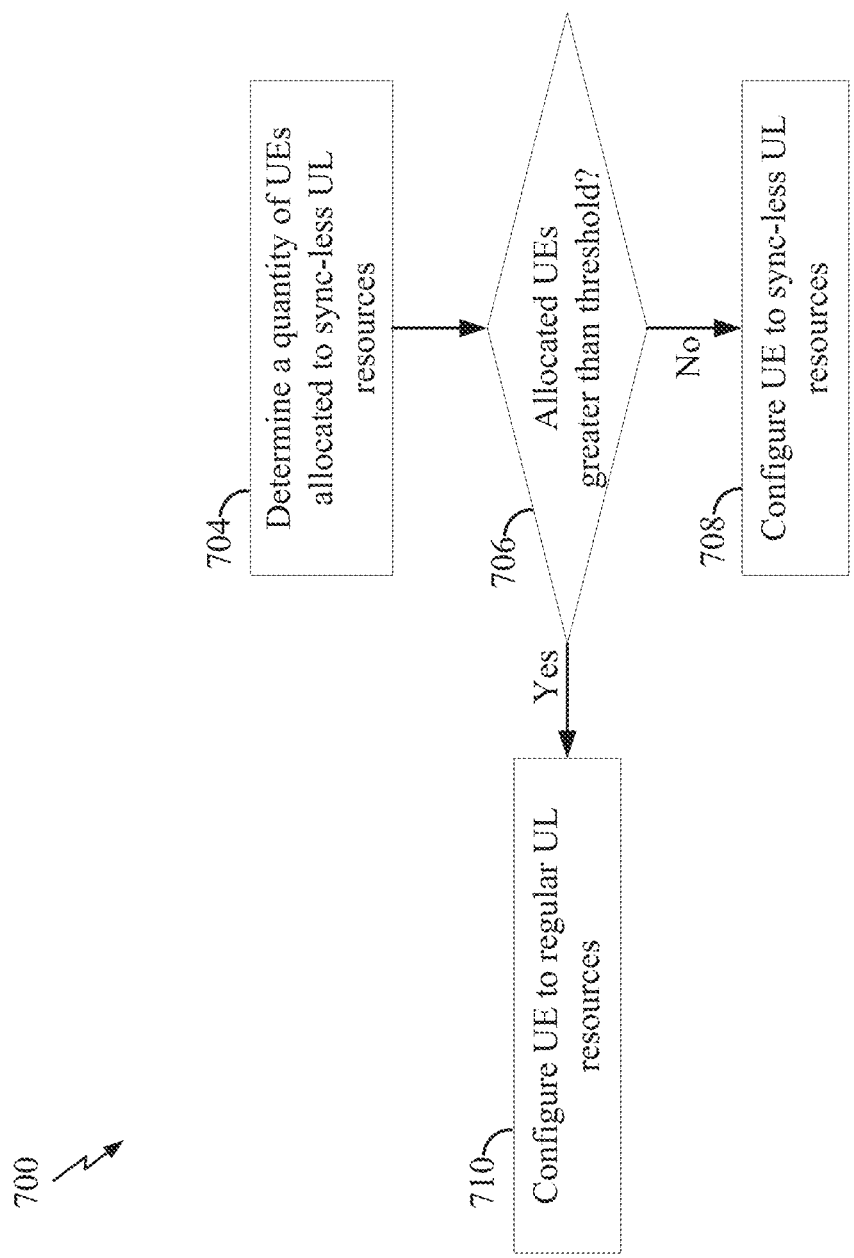
FIG. 7 is a flow chart illustrating a process for allocating sync-less UL resources according to some aspects of the disclosure.

FIG. 7 is a flow chart illustrating a process 700 for allocating sync-less UL resources according to some aspects of the disclosure. In some examples, the process 700 may be carried out by the scheduling entity 108 illustrated in FIG. 1. In some examples, the process 700 may be carried out by any suitable apparatus or means for carrying out the functions or algorithm described below. In some examples, a base station may use the process 700 to allocate regular UL resources or sync-less UL resources to a UE.

Starting at block 704, the scheduling entity may determine the quantity of UEs already allocated or assigned to certain sync-less UL resources. For example, some resources (e.g., REs in each slot) may have been allocated to sync-less UL data (e.g., UCI) and shared by a plurality of UEs. At decision block 706, the scheduling entity determines whether the quantity of UEs already allocated to sync-less UL resources is greater than a predetermined threshold. In one example, the threshold may be 50% of all UEs camped in the cell or a predetermined number of UEs.

At block 708, if it is determined that the quantity of UEs already allocated to sync-less UL resources is not greater than the threshold, the scheduling entity may configure a UE to use the sync-less UL resources. However, at block 710, if it is determined that the quantity of UEs already allocated to sync-less UL resources is greater than the threshold, the scheduling entity may configure the UE to use regular UL resources that need UL synchronization before the UE can transmit UL data (e.g., UCI). In some examples, the scheduling entity may transmit the scheduling information (e.g., UL grant) in a PDSCH or PDCCH.

The scheduling entity may distinguish the UEs utilizing the same UL resources based on the different orthogonal codes (e.g., CDM codes or sequences) used by the UEs. The orthogonality of the codes can be maintained even when the UE transmits UL data without UL synchronization. In some examples, the orthogonal codes may be generated by cyclic shifts of a predetermined sequence (e.g., Gold sequence). In general, the scheduling entity may allocate more UEs to the same resources that require UL timing synchronization because the orthogonality of the different UL transmissions will be better maintained than that in the sync-less resources.

Figure 8:
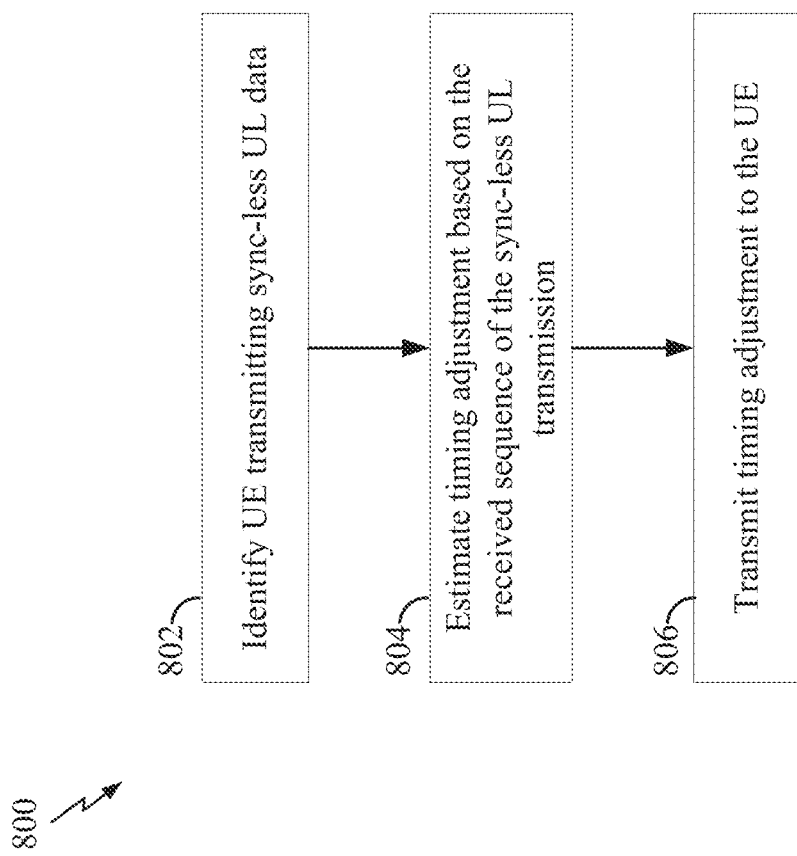
FIG. 8 is a flow chart illustrating a process for transmitting timing adjustments to user equipment according to some aspects of the disclosure.

FIG. 8 is a flow chart illustrating a process 800 for transmitting timing adjustments to UEs according to some aspects of the disclosure. In some examples, the process 800 may be carried out by the scheduling entity 108 illustrated in FIG. 1. In some examples, the process 800 may be carried out by any suitable apparatus or means for carrying out the functions or algorithm described below. In some examples, the scheduling entity (e.g., base station, eNB, gNB) may send timing adjustments to the UEs that transmit sync-less UL data.

At block 802, the scheduling entity identifies a UE that transmits sync-less UL data. For example, the scheduling entity identifies the UE based on its UE ID (e.g., C-RNTI) or preamble of the UE's sync-less UL transmission. At block 804, the scheduling entity estimates a timing adjustment based on the received sequence of the UE's sync-less UL transmission. For example, the timing adjustment may be based on the time of arrival (TOA) of the UE's signal at the scheduling entity. The TOA of the signal depends on the distance between the UE and scheduling entity. The scheduling entity may determine the timing adjustment so that all UE's transmissions arrive at the scheduling entity at roughly the same time, regardless of the UE's distance. Different UEs may have different timing adjustments so that the transmissions of nearby UEs may be delayed more relative to UEs that are further away from the scheduling entity. At block 806, the scheduling entity transmits the timing adjustment to the UE. For example, the scheduling entity may transmit the timing adjustment in a PDCCH or DCI. The timing adjustment may include a plurality of bits. The value of the bits may be used by the UE to control the amount of timing adjustment that the UE has to apply. For example, the timing adjustment may be a timing advance index that indicates the change of the uplink timing relative to the current uplink timing.

In some aspects of the disclosure, the scheduling entity's response (e.g., base station response 512) to an UL transmission (e.g., SR, beam failure indication, BSR) may or may not include a timing adjustment. In some examples, the timing adjustment may be mandated by the network. In that case, the scheduling entity (e.g., base station or gNB) may include the timing adjustment in the PDCCH transmission. When the UE receives a PDCCH transmission, the UE may ignore the PDCCH if it does not include the mandated timing adjustment. In some examples, the scheduling entity may include timing adjustments in its responses only for certain conditions. For example, the scheduling entity may include timing adjustments in response to UL transmission that uses sync-less UL resources. In some examples, the scheduling entity may include timing adjustments in response to certain types of UCI (e.g., beam failure indication and SR). Further, the interpretation of the timing adjustment command may depend on the type of UCI being responded to. For example, responses to certain UCIs (such as beam failure indication) may have a larger number of bits for the timing-adjustment field, allowing for a wider range and/or a finer granularity of timing adjustment.

Figure 9:
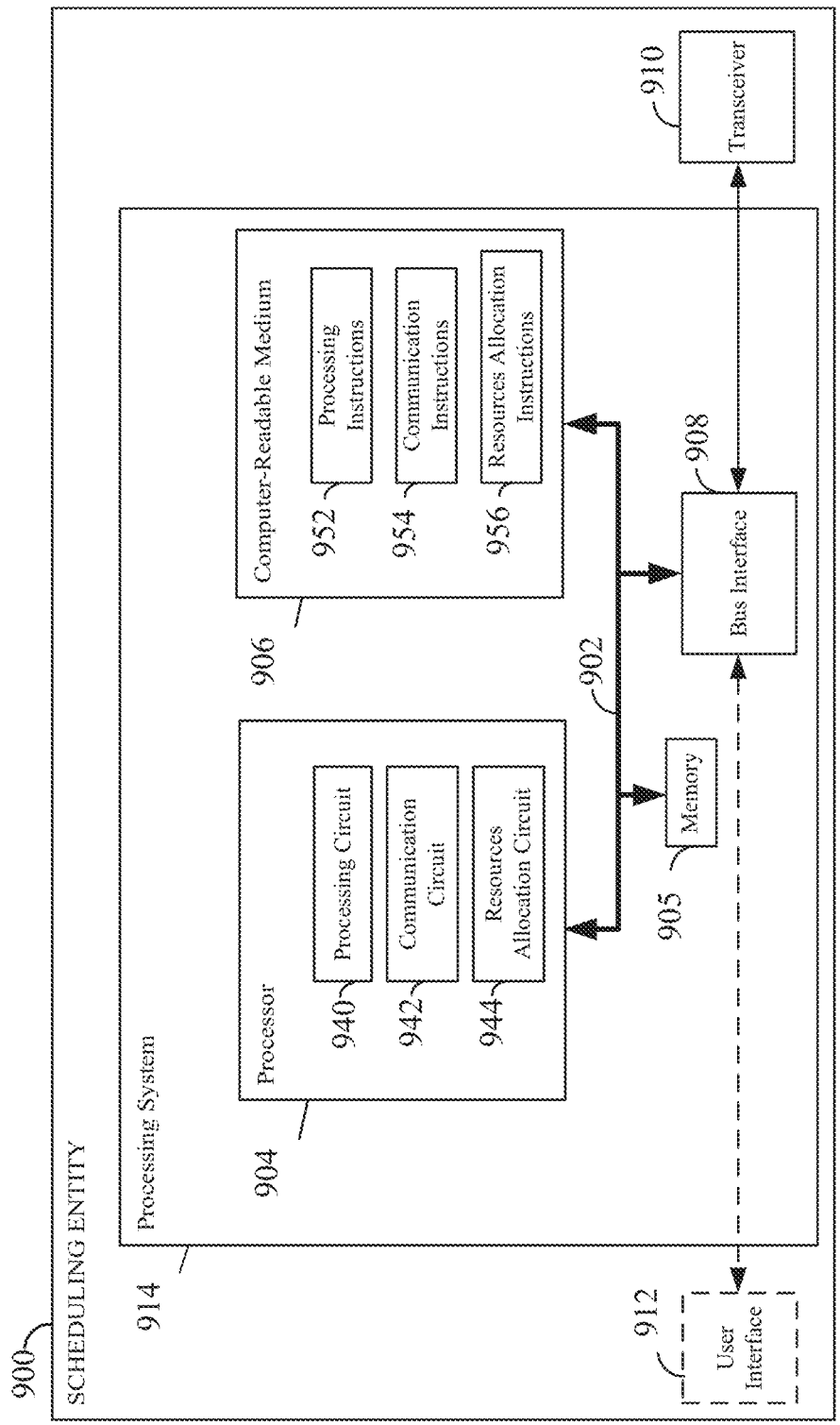
FIG. 9 is a block diagram conceptually illustrating an example of a hardware implementation for a scheduling entity according to some aspects of the disclosure.

FIG. 9 is a block diagram illustrating an example of a hardware implementation for a scheduling entity 900 employing a processing system 914. For example, the scheduling entity 900 may be a user equipment (UE) as illustrated in any one or more of FIGS. 1, 2, 3, and/or 5. In another example, the scheduling entity 900 may be a base station as illustrated in any one or more of FIGS. 1, 2, 3, and/or 5.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes and procedures described and illustrated in relation to FIGS. 5-8 and 10.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and may be omitted in some examples, such as a base station.

In some aspects of the disclosure, the processor 904 may include circuitry configured for various functions, including, for example, processing circuitry 940, communication circuitry 942, and resources allocation circuitry 944. For example, the circuitry may be configured to implement one or more of the functions and algorithm described in relation to FIGS. 5-8 and 10. In some examples, the processing circuitry 940 may be configured to perform various data processing functions. The communication circuitry 942 may be configured to perform various communication functions including decoding, encoding, modulation, demodulation, mapping, demapping, multiplexing, demultiplexing, interleaving, de-interleaving, error correction, transmitting and receiving signal via the transceiver 910, etc. The resources allocation circuitry 944 may be configured to allocate communication resources to UEs. For example, the resources allocation circuitry 944 may allocate sync-less UL resources to UEs for transmitting certain UL data without first achieving UL synchronization.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include software configured for various functions, including, for example, processing instructions 952, communication instructions 954, and resources allocation instructions 956. For example, the software may be configured to implement one or more of the functions described in relation to FIGS. 5-8 and 10.

In some examples, the processing instructions 952 may be configured to perform various data processing functions. The communication instructions 954 may be configured to perform various communication functions including decoding, encoding, modulation, demodulation, mapping, demapping, multiplexing, demultiplexing, interleaving, de-interleaving, error correction, transmitting and receiving signal via the transceiver 910, etc. The resources allocation instructions 956 may be configured to allocate communication resources to UEs. For example, the resources allocation instructions 956 may allocate sync-less UL resources to UEs for transmitting certain UL data without first achieving UL synchronization.

Figure 10:
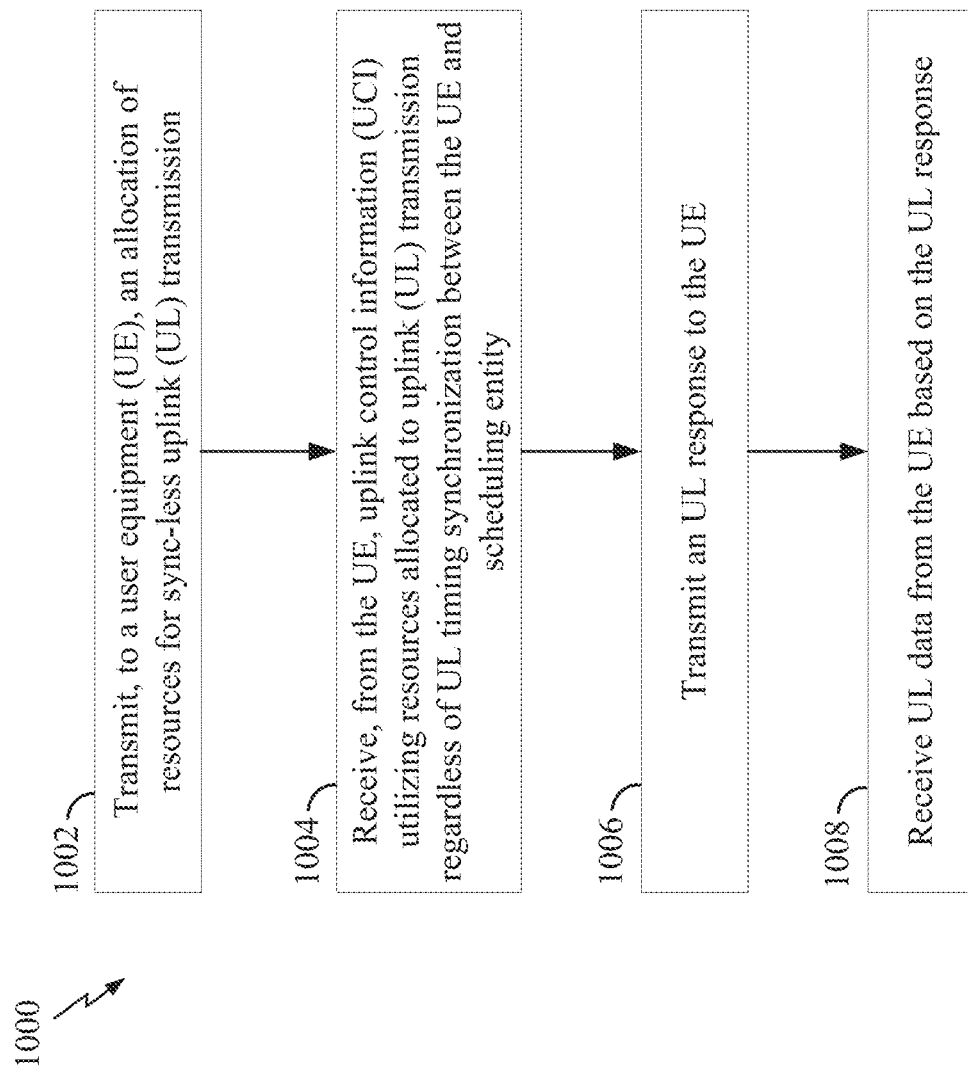
FIG. 10 is a flow chart illustrating an exemplary process for receiving uplink control information (UCI) without UL timing synchronization between a UE and a base station according to some aspects of the disclosure.

FIG. 10 is a flow chart illustrating an exemplary process 1000 for receiving uplink control information without UL timing synchronization in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduling entities illustrated in FIGS. 1-3, 5, and 9. In some examples, the process 1000 may be carried out by any suitable apparatus or means for carrying out the functions or algorithm described below.

At block 1002, the scheduling entity 900 (e.g., base station) may use the communication circuitry 942 and transceiver 910 to transmit an allocation of resources (e.g., RBs) for sync-less UL transmission to a UE. For example, the scheduling entity may transmit the sync-less resource allocation using broadcast and/or dedicated messages (e.g., SIB, DCI, RRC messages). The sync-less UL transmission may be the same as that described above in relation to FIGS. 5-8.

At block 1004, the scheduling entity may use its communication circuitry 942 and transceiver 910 to receive UCI from the UE. The UCI is transmitted using the sync-less UL resources allocated to UL transmissions regardless of UL timing synchronization between the UE and the scheduling entity. In some examples, the UCI may include beam failure indication, scheduling request (SR), and/or buffer status report (BSR). Using sync-less UL resources, the UE may transmit the UCI with or without first performing UL synchronization with the scheduling entity. Therefore, UL latency may be reduced.

At block 1006, the scheduling entity may use its communication circuitry 942 and transceiver 910 to transmit a base station response to the UE. For example, if the UCI includes an SR or BSR, the base station response may provide an UL grant. The scheduling entity may use its resources allocation circuitry 944 to determine the UL grant that allocates certain resources for UL transmission. If the UCI includes a beam failure indication, the scheduling entity may transit a beam reference signal on one or more new beams. Then, at block 1008, the scheduling entity may optionally use its communication circuitry 942 and transceiver 910 to receive UL data from the UE based on the base station response (e.g., UL grant). For example, the scheduling entity may receive UL data utilizing UL resources scheduled by the UL grant. This process can reduce the latency in receiving the UL data because the UE does not need to go through a full random access procedure to obtain UL timing synchronization before transmitting the UCI (e.g., SR).

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIGS. 1, 2, 3, and/or 5.

The processing system 1114 may be substantially the same as the processing system 914 illustrated in FIG. 9, including a bus interface 1108, a bus 1102, memory 1105, a processor 1104, and a computer-readable medium 1106. The memory may store UL data in an UL buffer 1120 and sync-less preambles 1122 for transmitting UL data. Furthermore, the scheduled entity 1100 may include a user interface 1112 and a transceiver 1110 substantially similar to those described above in FIG. 9. That is, the processor 1104, as utilized in a scheduled entity 1100, may be used to implement any one or more of the processes described and illustrated in FIGS. 5-8 and 12.

In some aspects of the disclosure, the processor 1104 may include circuitry configured for various functions, including, for example, processing circuitry 1140, UL communication circuitry 1142, and DL communication circuitry 1144. For example, the circuitry may be configured to implement one or more of the functions described below in relation to FIG. 12. In one or more examples, the computer-readable storage medium 1106 may include software configured for various functions, including, for example, processing instructions 1152, UL communication instructions 1154, and DL communication instructions 1156. For example, the software may be configured to implement one or more of the functions described in relation to FIGS. 5-8 and 12.

In some examples, the processing circuitry 1140 may be configured to perform various data processing functions. The UL communication circuitry 1142 may be configured to perform various UL communication functions including encoding, modulation, mapping, multiplexing, interleaving, error correction encoding, transmitting signal via the transceiver 1110, etc. The DL communication circuitry 1144 may be configured to perform various DL communication functions including decoding, demodulation, demapping, demultiplexing, de-interleaving, error correction decoding, receiving signal via the transceiver 1110, etc. In some examples, the processing instructions 1152 may be configured to perform various data processing functions. The UL communication instructions 1154 may be configured to perform various UL communication functions including encoding, modulation, mapping, multiplexing, interleaving, error correction encoding, transmitting signal via the transceiver 1110, etc. The DL communication instructions 1156 may be configured to perform various DL communication functions including decoding, demodulation, demapping, demultiplexing, de-interleaving, error correction decoding, receiving signal via the transceiver 1110, etc.

FIG. 12 is a flow chart illustrating an exemplary process 1200 for transmitting uplink control information without UL timing synchronization in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by any of the scheduled entities illustrated in FIGS. 1-3, 5, and 11. In some examples, the process 1200 may be carried out by any suitable apparatus or means for carrying out the functions or algorithm described below.

At block 1202, a scheduled entity 1100 (e.g., UE) may use its DL communication circuitry 1144 and transceiver 1110 to receive an allocation of resources for UL transmission from a base station or scheduling entity. For example, the scheduled entity may receive the resource allocation in a broadcast and/or dedicated message (e.g., SIB, DCI, and RRC messages). At least some of the allocated resources may be used for sync-less UL transmission. In some examples, the scheduled entity may receive a sync-less resource configuration (e.g., configuration 506 of FIG. 5) that indicates the sync-less UL resources. The sync-less resource configuration may provide a number of preambles that may be used for transmitting UL data or UCI using the sync-less UL resources. The preambles may be stored in the memory 1105 of the scheduled entity.

At block 1204, the scheduled entity may use its UL communication circuitry 1142 and transceiver 1110 to transmit uplink control information (UCI) utilizing the resources (e.g., sync-less resources) allocated to UL transmissions regardless of UL timing synchronization between the base station and UE. For example, the resources may include some REs in a slot allocated to UCI transmissions that are time critical. When the scheduled entity transmits UCI using the sync-less UL resources, the scheduled entity needs not perform UL timing synchronization with the base station before transmitting such UCI. In one example, the UCI may include an SR or beam failure indication.

At block 1206, the scheduled entity may use its DL communication circuit 1144 and transceiver 1110 to receive a base station response (e.g., UL grant) from the base station. For example, the UL grant may be received in a DCI of a PDCCH or PDSCH. In some examples, the base station response from the base station may include a beam reference signal. Then, at block 1208, the scheduled entity may use the UL communication circuitry 1142 and transceiver 1110 to optionally transmit UL data to the base station utilizing UL resources scheduled by the base station response. The UL data may be queued in an UL buffer in the memory 1105 (see FIG. 11) before transmission. This process can reduce the latency in transmitting the UL data because the scheduled entity does not go through a full random access procedure to obtain UL timing synchronization before transmitting the UCI.

In one configuration, the apparatus 900 and/or 1100 for wireless communication includes means for performing sync-less UL transmission as described above. In one aspect, the aforementioned means may be the processor(s) 904/1104 in which the invention resides shown in FIGS. 9/11 configured to perform the functions recited by the aforementioned means. In another aspect, the aforementioned means may be a circuit or any apparatus configured to perform the functions recited by the aforementioned means.

Of course, in the above examples, the circuitry included in the processor 904/1104 is merely provided as an example, and other means for carrying out the described functions may be included within various aspects of the present disclosure, including but not limited to the instructions stored in the computer-readable storage medium 906/1106, or any other suitable apparatus or means described in any one of the FIGS. 1, 2, 3, and/or 5, and utilizing, for example, the processes and/or algorithms described herein in relation to FIGS. 5-8, 10, and 12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
   receiving, from a base station, a resource configuration that allocates sync-less uplink (UL) resources;
   transmitting, to the base station, uplink control information (UCI) utilizing the sync-less UL resources regardless of UL timing synchronization between the base station and the UE;
   receiving, from the base station, a base station response corresponding to the UCI, the base station response comprising a timing adjustment;
   determining a granularity of the timing adjustment based on a type of the UCI transmitted to the base station, wherein the type of the UCI comprises at least one of a beam failure indication or a scheduling request; and
   transmitting UL data to the base station based on the base station response and the timing adjustment with the determined granularity.

2. The method of claim 1, wherein the resource configuration comprises one or more preambles associated with the sync-less UL resources for transmitting the UCI.

3. The method of claim 2, wherein the transmitting the UCI comprises:
   selecting a preamble of the one or more preambles; and
   transmitting the UCI using the sync-less UL resources corresponding to the selected preamble.

4. The method of claim 1, wherein the resource configuration explicitly indicates that the sync-less UL resources are allocated to be used to transmit the UCI regardless of the UL timing synchronization.

5. The method of claim 1, wherein the resource configuration implicitly indicates that the sync-less UL resources are allocated to be used to transmit the UCI regardless of the UL timing synchronization.

6. The method of claim 5, wherein the resource configuration implicitly indicates the sync-less UL resources based on at least one of UCI type, slot, carrier, or resource block index.

7. The method of claim 1, wherein determining the granularity of the timing adjustment comprises:
   determining a number of bits used for the timing adjustment based on the type of the UCI.

8. A method of wireless communication at a base station, comprising:
   transmitting, to a user equipment (UE), a resource configuration that allocates sync-less uplink (UL) resources;
   determining a quantity of UEs allocated to the sync-less UL resources;
   configuring the UE to transmit uplink control information (UCI) using the sync-less UL resources when the quantity of UEs allocated to the sync-less UL resources is less than a predetermined threshold;
   receiving, from the UE, the UCI utilizing the sync-less UL resources regardless of UL timing synchronization between the UE and the base station;
   transmitting, to the UE, a base station response corresponding to the UCI, wherein the base station response comprises a timing adjustment based on a type of the UCI, and the type of the UCI comprises at least one of a beam failure indication or a scheduling request; and receiving UL data from the UE based on the base station response.

9. The method of claim 8, wherein the resource configuration comprises one or more preambles associated with the sync-less UL resources for transmitting the UCI.

10. The method of claim 9, wherein the receiving the UCI comprises:
receiving the UCI using the sync-less UL resources corresponding to one of the one or more preambles.

11. The method of claim 8, wherein the resource configuration explicitly indicates that the sync-less UL resources are allocated to be used to transmit the UCI regardless of the UL timing synchronization.

12. The method of claim 8, wherein the resource configuration implicitly indicates that the sync-less UL resources are allocated to be used to transmit the UCI regardless of the UL timing synchronization.

13. The method of claim 12, wherein the resource configuration implicitly indicates the sync-less UL resources based on at least one of UCI type, slot, carrier, or resource block index.

14. A base station configured for wireless communication, comprising:
a communication interface configured to communicate with a user equipment (UE);
a memory; and
a processor coupled with the communication interface and the memory,
wherein the processor and the memory are configured to:
transmit, to the UE, a resource configuration that allocates sync-less uplink (UL) resources;
determining a quantity of UEs allocated to the sync-less UL resources;
configure the UE to transmit uplink control information (UCI) in an uplink control channel using the sync-less UL resources when the quantity of UEs allocated to the sync-less UL resources is less than a predetermined threshold;
receive, from the UE, the UCI utilizing the sync-less UL resources regardless of UL timing synchronization between the UE and the base station;
transmit, to the UE, a base station response corresponding to the UCI,
wherein the base station response comprises a timing adjustment based on a type of the UCI, and the type of the UCI comprises at least one of a beam failure indication or a scheduling request; and
receive UL data from the UE based on the base station response.

15. The base station of claim 14, wherein the resource configuration comprises one or more preambles associated with the sync-less UL resources for transmitting the UCI.

16. The base station of claim 15, wherein the processor and the memory are further configured to:
receive the UCI using the sync-less UL resources corresponding to one of the one or more preambles.

17. The base station of claim 14, wherein the resource configuration implicitly indicates that the sync-less UL resources are allocated to be used to transmit the UCI regardless of the UL timing synchronization.

18. The base station of claim 17, wherein the resource configuration implicitly indicates the sync-less UL resources based on at least one of UCI type, slot, carrier, or resource block.

19. A user equipment (UE) configured for wireless communication, comprising:
a communication interface configured to communicate with a base station;
a memory; and
a processor coupled with the communication interface and the memory,
wherein the processor and the memory are configured to:
receive, from the base station, a resource configuration that allocates sync-less uplink (UL) resources;
transmit, to the base station, uplink control information (UCI) utilizing the sync-less UL resources regardless of UL timing synchronization between the base station and the UE;
receive, from the base station, a base station response corresponding to the UCI, the base station response comprising a timing adjustment;
determine a granularity of the timing adjustment based on a type of the UCI transmitted to the base station, wherein the type of the UCI comprises at least one of a beam failure indication or a scheduling request; and
transmit UL data to the base station based on the base station response and the timing adjustment with the determined granularity.

20. The UE of claim 19, wherein the resource configuration comprises one or more preambles associated with the sync-less UL resources for transmitting the UCI.

21. The UE of claim 20, wherein the processor and the memory are further configured to:
select a preamble of the one or more preambles; and
transmit the UCI using the sync-less UL resources corresponding to the selected preamble.

22. The UE of claim 19, wherein the resource configuration implicitly indicates that the sync-less UL resources are allocated to be used to transmit the UCI regardless of the UL timing synchronization.

23. The UE of claim 22, wherein the resource configuration implicitly indicates the sync-less UL resources based on at least one of UCI type, slot, carrier, or resource block index.

24. The UE of claim 19, wherein, to determine the granularity of the timing adjustment, the processor and the memory are further configured to:
determine a number of bits used for the timing adjustment based on the type of the UCI.

\* \* \* \* \*